United States Patent
Yasuda et al.

(10) Patent No.: US 7,218,597 B2
(45) Date of Patent: May 15, 2007

(54) HOLOGRAPHIC RECORDING METHOD

(75) Inventors: Shin Yasuda, Ashigarakami-gun (JP); Katsunori Kawano, Ashigarakami-gun (JP); Jiro Minabe, Ashigarakami-gun (JP); Tatsuya Maruyama, Minato-ku (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 675 days.

(21) Appl. No.: 10/778,311

(22) Filed: Feb. 17, 2004

(65) Prior Publication Data
US 2005/0063028 A1    Mar. 24, 2005

(30) Foreign Application Priority Data
Sep. 22, 2003    (JP) .............................. 2003-330430

(51) Int. Cl.
*G11B 7/00* (2006.01)
(52) U.S. Cl. ...................... 369/103; 369/44.14; 359/28
(58) Field of Classification Search ...................... None
See application file for complete search history.

(56) References Cited
U.S. PATENT DOCUMENTS 5,777,760 A * 7/1998 Hays et al. ..................... 359/7
6,031,643 A * 2/2000 Burr ............................ 359/28
6,088,321 A * 7/2000 Yamaji et al. .............. 369/103
6,256,281 B1* 7/2001 Tanaka et al. .............. 369/103

FOREIGN PATENT DOCUMENTS

JP       A 10-340479       12/1998

OTHER PUBLICATIONS

Psaltis, et al.; Adaptive Optical Networks Using Photorefractive Crystals; Applied Optics; vol. 27 Issue 9 pp. 1752-1759 (May 1988).

* cited by examiner

Primary Examiner—Muhammad Edun
(74) Attorney, Agent, or Firm—Oliff & Berridge, PLC

(57) ABSTRACT

In the disclosed holographic recording method, when multiplex recording of data of a plurality of pages is performed, exposure time of a hologram of a final page to be recorded is fixed irrespective of a degree of multiplicity while an exposure time of each page is changed and diffraction efficiencies of the holograms of the plurality of pages becomes equal.

18 Claims, 11 Drawing Sheets

VOLUME MULTIPLE RECORDING
CAN BE PERFORMED BY ROTATING DISK

HOLOGRAPHIC RECORDING METHOD

CROSS-REFERENCE TO RELATED APPLICATION

This application claims priority under 35 USC 119 from Japanese Patent Application No. 2003-330430, the disclosure of which is incorporated by reference herein.

BACKGROUND OF THE INVENTION

1. Field of the Invention

The present invention relates to a holographic recording method. Particularly, the invention relates to the holographic recording method which performs multiplex recording of data into an optical recording medium in the form of a hologram.

2. Description of the Related Art

A holographic memory receives attention as a computer memory of the next generation. The holographic memory has both large capacity derived from a three-dimensional recording region and high speed derived from a two-dimensional batch recording and reproducing method. In the holographic memory, a plurality of data pages can be recorded by multiplexing the data pages in the same volume, and the data can be read out in each page by one operation. The digital data can be also recorded and reproduced in such a manner that not an analog image but binary digital data "0,1" is digitized in the form of "bright and dark" and recorded and reproduced in the form of the hologram. In recent years, a specific optical system of this digital holographic memory system, an S/N ratio or a bit error rate evaluation based on a volume multiplexing method, or two-dimensional coding has been proposed. Also, studies proceed from a more optical point of view such as influence of aberration of the optical system.

A shift multiplexing method which is one of the volume multiplexing methods will be described referring to FIGS. 11A and 11B. In the shift multiplexing method, a light wave whose wavefront is rapidly changed, such as a spherical wave and a speckle pattern, is used as a reference light beam. In the case where the reference light is used, Bragg condition for the reproduction can be avoided only by slightly shifting a position of the recording medium by the amount of shift δ from the recording spot (FIG. 11B), and the new hologram can be recorded there. That is to say, the multiplexing of the hologram can be performed in the substantially same volume by slightly shifting the recording medium. As described above, in the digital holographic storage, both the high-speed transfer by the two-dimensional batch recording and reproducing method and the increase in the recording capacity by the volume recording can be realized at the same time.

In the case where the multiplexing is performed, in order to sufficiently use a dynamic range of the optical recording medium, there is proposed a schedule exposure method in which exposure time is gradually decreased from a front-end page to a final page so that a diffraction efficiency of each page to be multiplexed becomes equal after the recording is performed so that the diffraction efficiency of the front-end page becomes maximum (Psaltis, et al, Applied Optics vol. 27, issue 9, page 1752 (1988)).

Usually the digital data is expressed in the form of a two-dimensional image, when the digital data to be recorded in the recording medium is digitally displayed by a spatial light modulator. In the two-dimensional image, the maximum step of gradation is indicated as 1 of the digital data and the minimum step of the gradation is indicated as 0 of the digital data. The maximum step of the gradation can be indicated as 0 of the digital data and the minimum step of the gradation can be indicated as 1 of the digital data. The two-dimensional image is transferred to the spatial light modulator to generate a signal light beam, and the two-dimensional image is recorded in the recording medium in the form of the hologram. In reproducing the hologram, a reproduced image is received by using a detector such as CCD. The original digital data is decoded from the reproduced image. For example, in the case where the reproduced image is received by CCD in which each pixel has an 8-bit gradation (256-step gradation), in the 256-step gradation, ideally 1 of the original data is indicated by 255 (white) and 0 of the original data is indicated by 0 (black)

Here, the gradation of each data varies by recording and reproducing conditions, setting of the dynamic range of CCD, noise, or the like. When the gradation of each data is shown by a histogram, there are two distributions of the distribution indicating 1 and the distribution indicating 0 in the histogram. When the distributions are separated from each other, the decoding can be correctly performed in such a manner that the gradation step not belonging to both distributions is used as a threshold to compare the threshold to the gradation step of the data.

As an overlap between the two distributions is increased, the number of pieces of the data in which 1 can not be correctly distinguished from 0 is increased, and readout error is increased. Accordingly, in order to decrease the readout error, it is necessary that the two distributions do not overlap with each other but the two distributions are separated from each other. Further, in order that the threshold used for the decoding is fixed irrespective of the reproduced image, it is desirable that the diffraction efficiency of each hologram is fixed.

The conventional schedule exposure method was predicated on the multiplex recording of the hologram having the acceptable maximum number of the recording medium after performing the recording so that the diffraction efficiency of the front-end page becomes the maximum. In this case, the number of pages (degree of multiplicity) to be multiplexed is fixed, so that only one kind of the schedule exposure method could be used.

Here, A situation where the one kind of the schedule exposure method is used is considered. When the multiplexing of an arbitrary number of pages is performed such that the multiplexing is performed in each file, diffraction efficiencies of the holograms included in files having different degrees of multiplicity do not become equal.

That is to say, in the case where the one kind of the schedule exposure method is used, the diffraction efficiency of the front-end page is caused to be a maximum, and the number of exposure times is determined according to the number of pages to be multiplexed. Therefore, large variations in the final diffraction efficiencies are generated between the case in which the multiplexing of the large number of pages is performed and the case in which the multiplexing of the small number of pages is performed. In this case, the diffraction efficiency of the case in which the multiplexing of the small number of pages is performed is larger than that of the case in which the multiplex recording of the large number of pages is performed. Accordingly, in order that the final diffraction efficiency is caused to be equal irrespective of the degree of multiplicity, it is necessary to adopt the proper exposure schedule according to the degree of multiplicity.

SUMMARY OF THE INVENTION

In view of the foregoing, it is an object of the present invention to provide the holographic recording method in which variations in diffraction efficiency of each page can be prevented irrespective of the degree of multiplicity while recording time is intended to shorten when the multiplex recording of data of a plurality of pages is performed.

In order to achieve the above object, a first holographic recording method of the invention comprises performing multiplex recording of information of a signal light beam into an optical recording medium in the form of holograms of a plurality of pages, in such a manner that a recording angle is changed by irradiating the optical recording medium with the signal light beam and a reference light beam at the same time while an angle formed by the signal light beam and the reference light beam is being changed, wherein the multiplex recording of data of the plurality of pages is performed, in such a manner that an exposure time of the hologram of a final page to be recorded is fixed irrespective of a degree of multiplicity while the exposure time of each page is changed so that diffraction efficiencies of the holograms of the plurality of pages become equal.

A second holographic recording method of the invention comprises performing multiplex recording of information of a signal light beam into an optical recording medium in the form of holograms of a plurality of pages, in such a manner that an angle formed by the signal light beam and a reference light beam is fixed and a recording position is changed by irradiating the optical recording medium with the signal light beam and the reference light beam at the same time while at least one of the signal light beam and the reference light beam and the optical recording medium is relatively being moved, wherein the multiplex recording of data of the plurality of pages is performed, in such a manner that an exposure time of the hologram of a final page to be recorded is fixed irrespective of a degree of multiplicity while an exposure time of each page is changed so that diffraction efficiencies of the holograms of the plurality of pages becomes equal.

A third holographic recording method comprises performing multiplex recording of information of a signal light beam into an optical recording medium in the form of holograms of a plurality of pages, in such a manner that an angle formed by the signal light beam and a reference light beam is fixed and the optical recording medium is irradiated with the signal light beam and the reference light beam at the same time while a phase of the reference light beam is being changed, wherein the multiplex recording of data of the plurality of pages is performed, in such a manner that an exposure time of the hologram of a final page to be recorded is fixed irrespective of a degree of multiplicity while an exposure time of each page is changed so that diffraction efficiencies of the holograms of the plurality of pages becomes equal.

In the first to third holographic recording methods, when the multiplex recording of data of a plurality of pages is performed, the exposure time of the hologram of the final page to be recorded is fixed irrespective of the degree of multiplicity while the exposure time of each page is changed so that diffraction efficiencies of the holograms of the plurality of pages becomes equal. Therefore, even in the case of the data having the different degree of multiplicity, the diffraction efficiency of the hologram of each page becomes equal, and the variations in diffraction efficiency are prevented. Further, the exposure time of the hologram of the final page is fixed irrespective of the degree of multiplicity, so that the recording time can be intended to shorten.

In order to achieve the above object, a fourth holographic recording method of the invention comprises performing multiplex recording of information of a signal light beam into an optical recording medium in the form of holograms of a plurality of pages, in such a manner that a recording angle is changed by irradiating the optical recording medium with the signal light beam and a reference light beam at the same time while an angle formed by the signal light beam and the reference light beam is being changed, wherein the multiplex recording of data of the plurality of pages in each file is performed, in such a manner that each exposure time of the holograms of final pages included in different files is fixed irrespective of a degree of multiplicity while an exposure time of each page is changed so that diffraction efficiencies of the holograms of the plurality of pages included in the same file becomes equal.

A fifth holographic recording method of the invention comprises performing multiplex recording of information of a signal light beam into an optical recording medium in the form of holograms of a plurality of pages, in such a manner that an angle formed by the signal light beam and a reference light beam is fixed and a recording position is changed by irradiating the optical recording medium with the signal light beam and the reference light beam at the same time while at least one of the signal light beam and the reference light beam and the optical recording medium is relatively being moved, wherein the multiplex recording of data of the plurality of pages in each file is performed, in such a manner that each exposure time of the holograms of final pages included in different files is fixed irrespective of a degree of multiplicity while an exposure time of each page is changed so that diffraction efficiencies of the holograms of the plurality of pages included in the same file becomes equal.

A sixth holographic recording method of the invention comprises performing multiplex recording of information of a signal light beam into an optical recording medium in the form of holograms of a plurality of pages, in such a manner that an angle formed by the signal light beam and a reference light beam is fixed and the optical recording medium is irradiated with the signal light beam and the reference light beam at the same time while a phase of the reference light beam is being changed, wherein the multiplex recording of data of the plurality of pages in each file is performed, in such a manner that each exposure time of the holograms of final pages included in different files is fixed irrespective of a degree of multiplicity while an exposure time of each page is changed so that diffraction efficiencies of the holograms of the plurality of pages included in the same file becomes equal.

In the fourth to sixth holographic recording methods, when the multiplex recording of data of a plurality of pages is performed in each file, each exposure time of the holograms of the final pages included in the different files is fixed irrespective of the degree of multiplicity while the exposure time of each page is changed so that diffraction efficiencies of the holograms of the plurality of pages included in the same file becomes equal. Therefore, even among the pieces of data having the different degree of multiplicity, the diffraction efficiency of the hologram of each page becomes equal, and the variations in diffraction efficiency are prevented. Further, the exposure time of the hologram of the final page is fixed irrespective of the degree of multiplicity, so that the recording time can be intended to shorten.

In the above holographic recording methods, exposure time $t_N$ of the hologram to be recorded for the Nth time can be expressed by an expression including a term of an exponential function having variables M and N, in the case where the degree of multiplicity is set to M. It will be also appreciated that the exposure time $t_N$ of the hologram to be recorded for the Nth time is expressed by the exponential function having variables M and N, in the case where the degree of multiplicity is set to M.

The invention obtains advantages that the recording time can be intended to shorten and the variations in diffraction efficiency can be prevented irrespective of the degree of multiplicity, when the multiplex recording of the data of the plurality of pages is performed.

DETAILED DESCRIPTION OF THE INVENTION

The holographic recording and reproducing apparatus according to an embodiment of the present invention will be described in detail below referring to the accompanying drawings. The holographic recording and reproducing apparatus of the embodiment is one in which the holographic recording method of the invention is applied to the shift multiplexing method.

Figure 1:
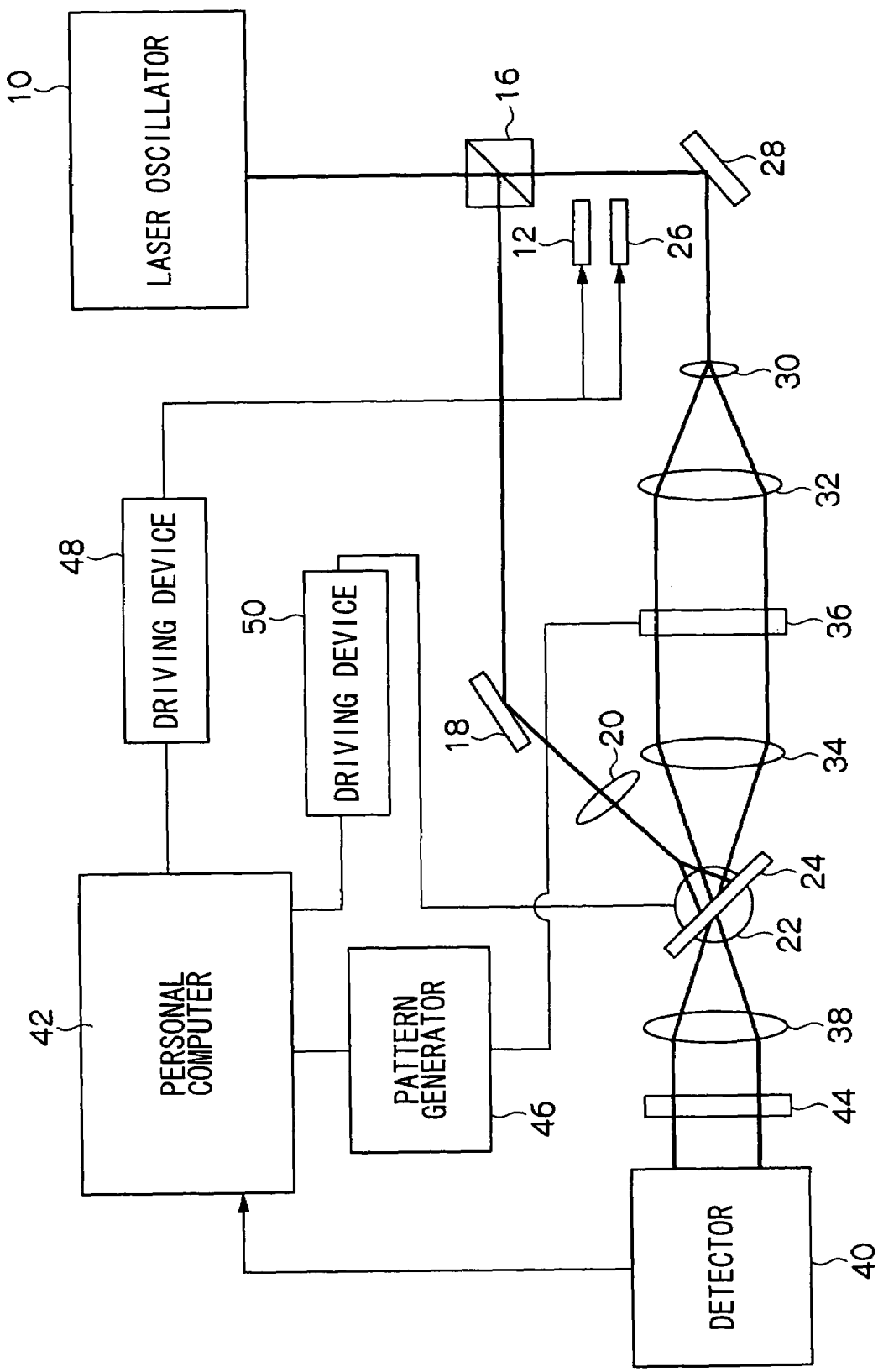
FIG. 1 is a schematic view showing a holographic recording reproducing apparatus used in an embodiment of the present invention.

As shown in FIG. 1, the holographic recording and reproducing apparatus of the embodiment includes a laser oscillator 10 using, e.g. a Nd:YVO$_4$ laser. The laser oscillator 10 oscillates a laser beam having a wavelength of 532 nm, which is of a coherent light beam. A polarizing beam-splitter 16 is arranged on a laser beam irradiating side of the laser oscillator 10. The polarizing beam-splitter 16 separates the laser beam into two light beams of the reference light beam and the signal light beam in a manner that transmits a P-polarized light beam and reflects an S-polarized light beam.

A reflecting mirror 18 and an objective lens 20 are arranged in order on a light reflection side of the polarizing beam-splitter 16. The reflecting mirror 18 reflects the laser beam for the reference light beam to change an optical path toward a direction of the holographic recording medium, and the objective lens 20 condenses the laser beam for the reference light beam to generate the reference light beam including a spherical reference wave. An x-z stage 22 is provided on a laser beam condensing side of the objective lens 20. The x-z stage 22 includes a stepping motor which rotates a holographic recording medium 24 formed in the shape of a disk in a z-plane. The holographic recording medium 24 is irradiated with the S-polarized light beam, which is of the spherical reference wave, as the reference light beam through the objective lens 20.

A shutter 12 interrupting the P-polarized light beam transmitted through the polarizing beam-splitter 16 and a polarization rotator 26 rotating a polarization plane by 90° are arranged on a light beam transmission side of the polarizing beam-splitter 16 so that the shutter 12 and the polarization rotator 26 can be individually inserted into and retracted from the optical path. A reflecting mirror 28 and a lens system including lenses 30, 32, and 34 are arranged in order on the light beam transmission side of the polarization rotator 26. The reflecting mirror 28 reflects the laser beam for signal light beam at a reflection angle of 45° to change the optical path toward the direction of the holographic recording medium. A transmission type of spatial light modulator 36 is arranged between the lens 32 and the lens 34. The spatial light modulator 36 includes a liquid crystal display device and the like and modulates the laser beam for the signal light beam according to the supplied recording signal in each page to generate the signal light beam for recording each page of the hologram.

The lenses 30 and 32 collimate the laser beam to form the light beam having a larger diameter, and the spatial light modulator 36 is irradiated with the light beam. The lens 34 condenses the P-polarized light beam, which has been modulated and transmitted with the spatial light modulator 36, on the holographic recording medium 24 for the purpose of the signal light beam. At this point, the condensing spot of the signal light beam is condensed so as to be smaller than the condensing spot of the reference light beam, the holographic recording medium 24 is simultaneously irradiated with the signal light beam and the reference light beam. Since the P-polarized light beam is set to the signal light beam and the S-polarized is set to the reference light beam, the signal light beam polarizing direction is orthogonal to the reference light beam polarizing direction in recording each page of the hologram. It will be appreciated that the S-polarized light beam is set to the signal light beam and the P-polarized is set to the reference light beam. The signal light beam and reference light beam whose polarization planes are parallel to each other may also be used. Further, it will be appreciated that circularly polarized light beams which are rotated in directions different from each other are used as the signal light beam and reference light beam.

A lens 38, an analyzer 44 which selects the light beam in a predetermined polarization direction (for example, 0° polarized component, 45° polarized component, or 90° polarized component) from the reproduced light beams and transmits the selected light beam, and a detector 40 which includes an imaging device such as CCD and converts the reproduced light beam into an electric signal to output it the reproduced light beam are arranged on a reproduced light beam transmission side of the holographic recording medium 24. The detector 40 is connected to a personal computer 42.

The personal computer 42 is connected to the spatial light modulator 36 through a pattern generator 46 which generates a pattern according to the recording signal supplied from the personal computer 42 at predetermined timing. The personal computer 42 is connected to a driving device 48. While the driving device 48 drives the shutter 12 and the polarization rotator 26 so as to be separately inserted into the optical path, the driving device 48 retracts separately the shutter 12 and the polarization rotator 26 which are inserted in the optical path from the optical path. Further, the personal computer 42 is connected to a driving device 50 which drives the x-z stage 22.

Figure 2A:
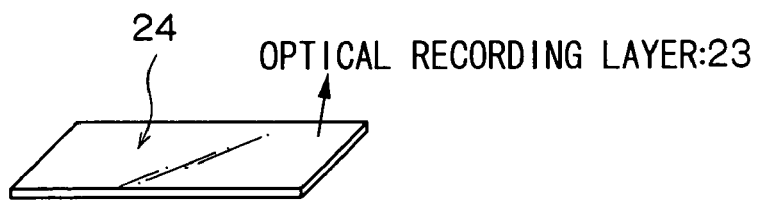
FIGS. 2A to 2C are a schematic view showing a structure of a holographic recording medium respectively.
Figure 2B:
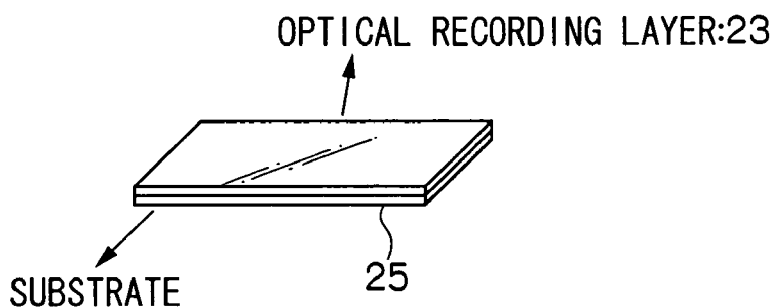
Figure 2C:
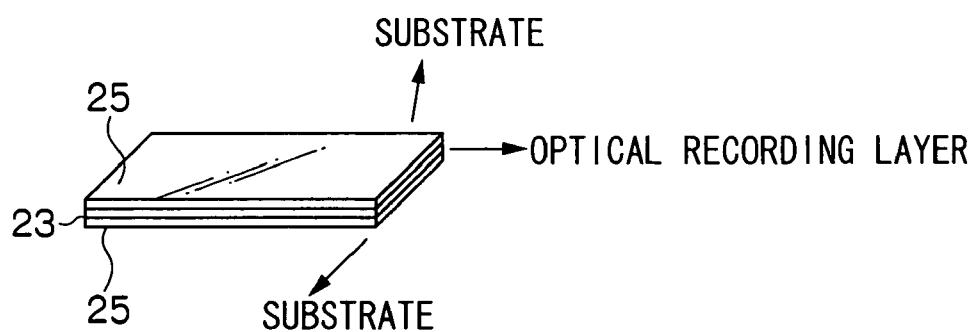

FIG. 2 shows a structure of the holographic recording medium (optical recording medium) 24. The holographic recording medium of the embodiment is formed in the shape of the disk, and FIG. 2 shows a part taken in the rectangular shape. As shown in FIG. 2A, the holographic recording medium 24 includes an optical recording layer 23 molded in the form of a thick film having thicknesses not lower than, e.g. 100 μm. In the case where the optical recording layer itself does not have sufficient strength, as shown in FIG. 2B or FIG. 2C, a substrate 25 including a plate-shaped transparent medium such as quartz or plastic is provided on one side or both sides of the optical recording layer.

Any material can be used for the optical recording layer 23, namely for the photosensitive layer as long as the material is a photorefractive material or a polarization sensitive material, which has photorefractive effect or photoinduced dichroism and hold them at room temperature. In particular, the material which is a macromolecule containing a group having photoisomerization in its side chain, e.g. the material which is at least one kind of a polymer selected from a polyester group and contains the group having photoisomerization in the side chain such as an azobenzene skeleton, may be selected for the optical recording layer. For the purpose of adjustment of light transmittance or the like, a polymer blend which is formed by mixing the macromolecule containing a photoinduced group such as the azobenzene skeleton and the macromolecule having small absorption to the recording light can be also used, and a copolymer of a monomer containing the photoinduced group such as the azobenzene skeleton and the monomer having the small absorption to the recording light can be also used.

A principle of photoinduced birefringence will be described below, taking azobenzene as an example. Azobenzene repeats an isomerization cycle of trans-cis-trans by light beam irradiation. The multiplicity of trans-azobenzene molecules is present in the optical recording layer before the light beam irradiation. These molecules are randomly oriented and macroscopically isotropic. When the azobenzene molecule is irradiated with linearly polarized light beam, the azobenzene molecule having an absorption axis in the same direction as the polarized direction is selectively isomerized from the trans-form to cis-form. The azobenzene molecule having the absorption axis in the direction orthogonal to the polarized direction, which has been relaxed in the transform, no longer absorbs the light and fixed at the state. As a result, macroscopic anisotropies of an absorption coefficient and a refractive index, namely the dichroism and the birefringence are induced. In the macromolecule including the group having the photoisomerization, the orientation of the macromolecule itself is changed by the photoisomerization and the large birefringence can be induced. The birefringence induced in the above-mentioned way is stable at temperatures not more than a glass transition temperature, and is suitable for recording each page of the hologram.

Polyester having cyanoazobenzene in the side chain represented by the following chemical formula (Japanese Patent Application Laid-Open (JP-A) No. 10-340479) may be selected for the material recording the hologram by utilizing the above-mentioned mechanism. In this polyester, resulting from the photoinduced anisotropy caused by the photoisomerization of cyanoazobenzene in the side chain, the polarized direction of the signal light beam can be recorded as the hologram, the hologram can be recorded at room temperature, and the recorded hologram can be stored semi-permanently.

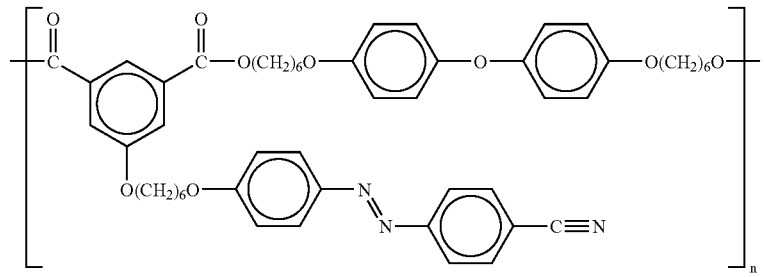

The polymer blend containing the two kinds of the macromolecules expressed by the following chemical formula 2-1 and chemical formula 2-2 can be also used. In the case where the recording medium having a thick film is used, since light absorption in the thick film is increased as the film thickness is increased, a mixture ratio of the two kinds of the macromolecules is properly set in order to adjust an index of absorption of the medium or the like. This allows the satisfactory recording of the hologram to be performed into the volume of the recording medium.

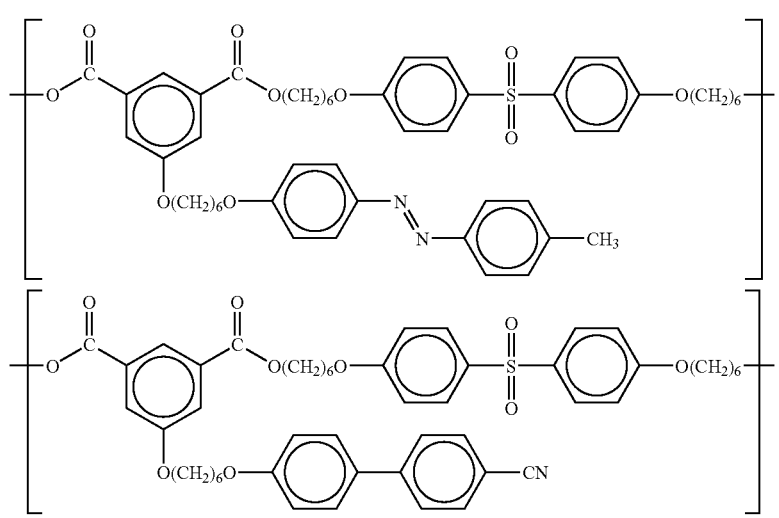

Chemical formulae 2-1 and 2-1

Figure 3:
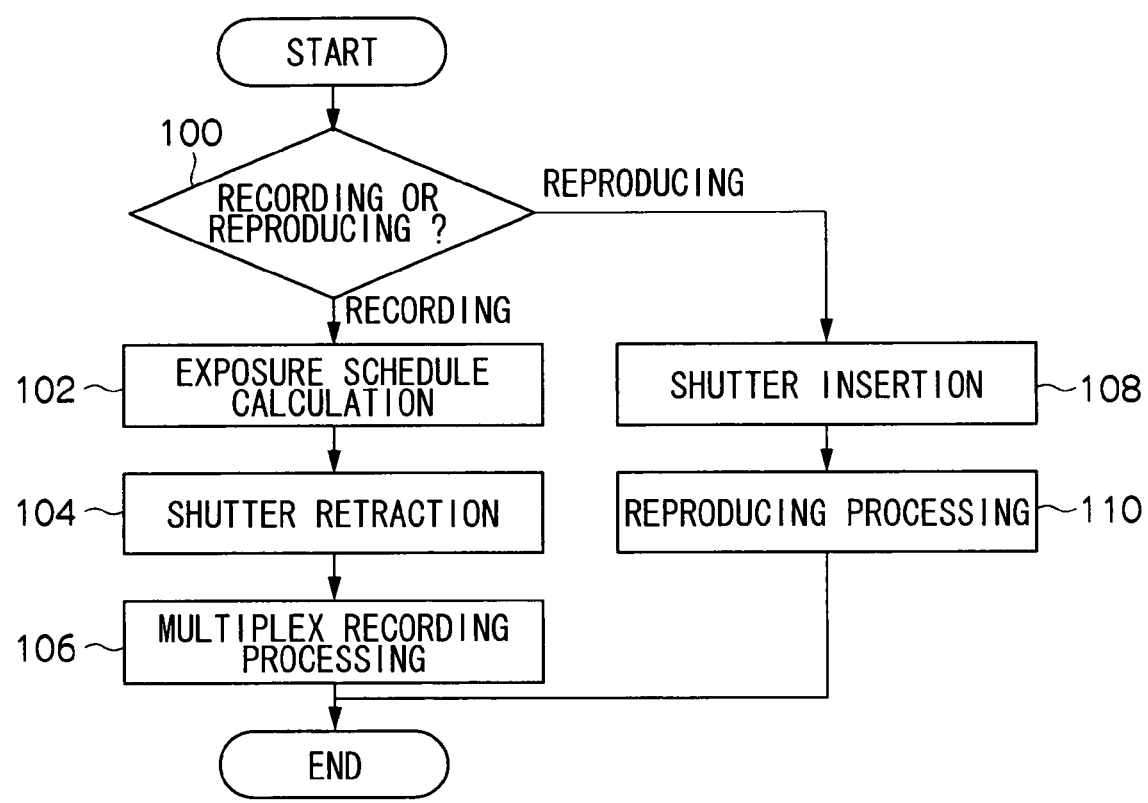
FIG. 3 is a flow chart showing a holographic recording and reproducing routine of the embodiment.

Referring to FIG. 3, a recording and reproducing processing routine executed by the personal computer 42 will be described below. At first an operator operates an operating device (not shown) to select whether recording processing of the hologram or reproducing processing of the hologram. In the case where the file is recorded as the holograms of the plurality of pages, the file is previously input into the personal computer 42 to generate the recording signal.

In Step 100, the personal computer 42 decides whether the recording processing of the hologram has been selected or the reproducing processing of the hologram has been selected. If the recording processing of the hologram has been selected, in Step 102 the personal computer 42 decides that an exposure schedule is calculated according to the number of pages of the file.

Setting the number of pages of the file, i.e. a degree of multiplicity of the file to M, exposure time $t_N$ (second) for exposing the Nth page of the file can be given by the following expression (1).

Expression 1

$$t_N = A\exp(-B(N-M)) \quad (1)$$

Where A and B are a constant. The constant A can be set to a value of the exposure time (sec) for obtaining the diffraction efficiency required for the reproduction from the hologram of the final page. The constant B can be set according to characteristics of the recording medium or recording light intensity so that the variations in diffraction efficiency of each page are decreased. In order to further decrease the variations in diffraction efficiency, it will be appreciated that a dummy page is added to the final page. That is to say, when the multiplex recording of the data having the (m−1) pages is performed, the data having the m pages is made as a whole by adding the dummy page to the final page. The exposure schedule can be determined by substituting m into the degree of multiplicity M of the expression (1).

For example, in the case where the recording is performed in the polymer blend of the macromolecule expressed by the chemical formula (2) and the 50wt % macromolecule expressed by the chemical formula (1) by using the recording light beam having the light intensity of 220 mW/cm², the expression (1) can be given by the following expression (2).

Expression 2

$$t_N = 0.25\exp(-0.09(N-M)) \quad (2)$$

Figure 7:
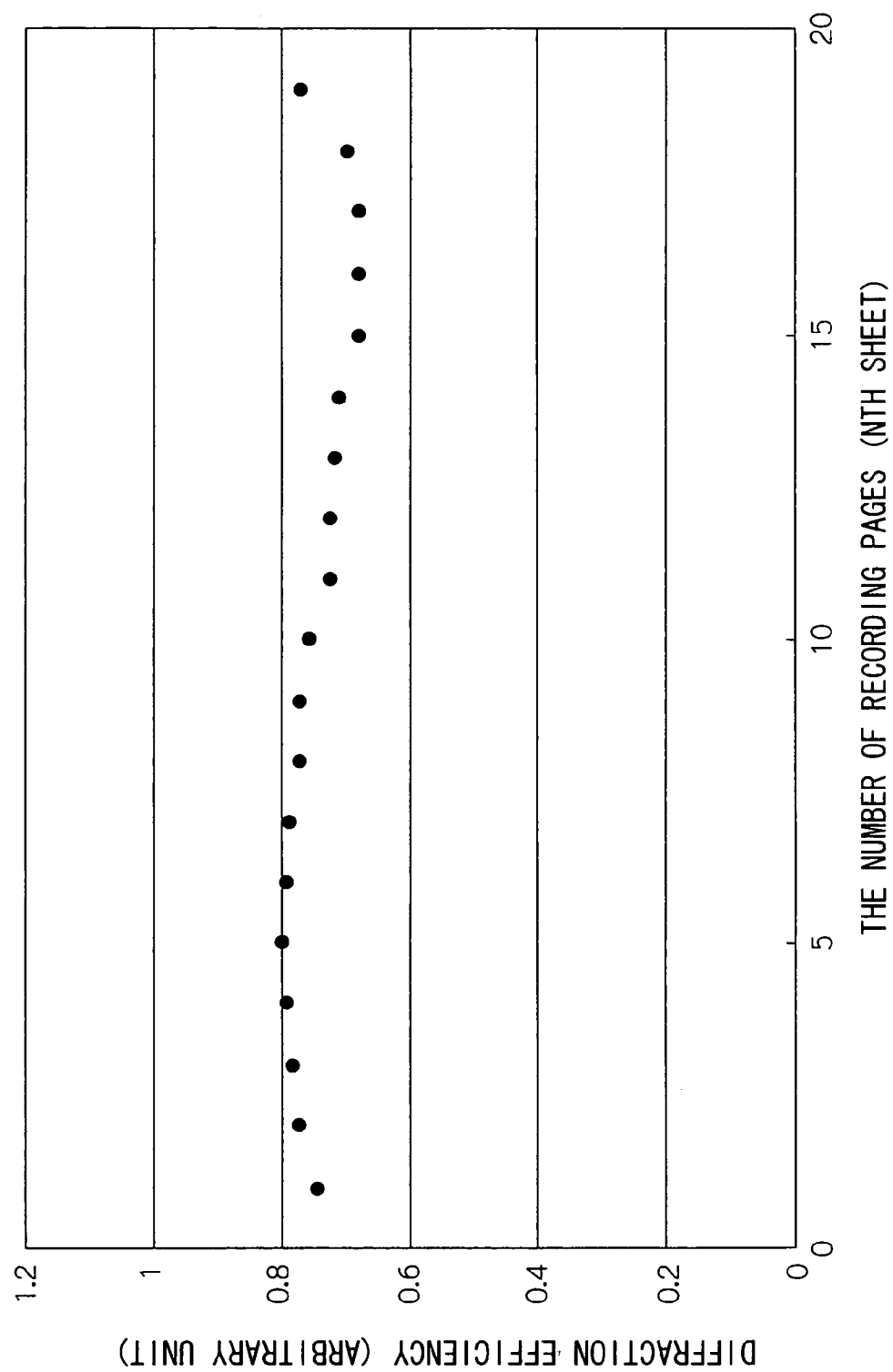
FIG. 7 is a graph showing normalized diffraction efficiency of a reproduced image at a predetermined degree of multiplicity.
Figure 8:
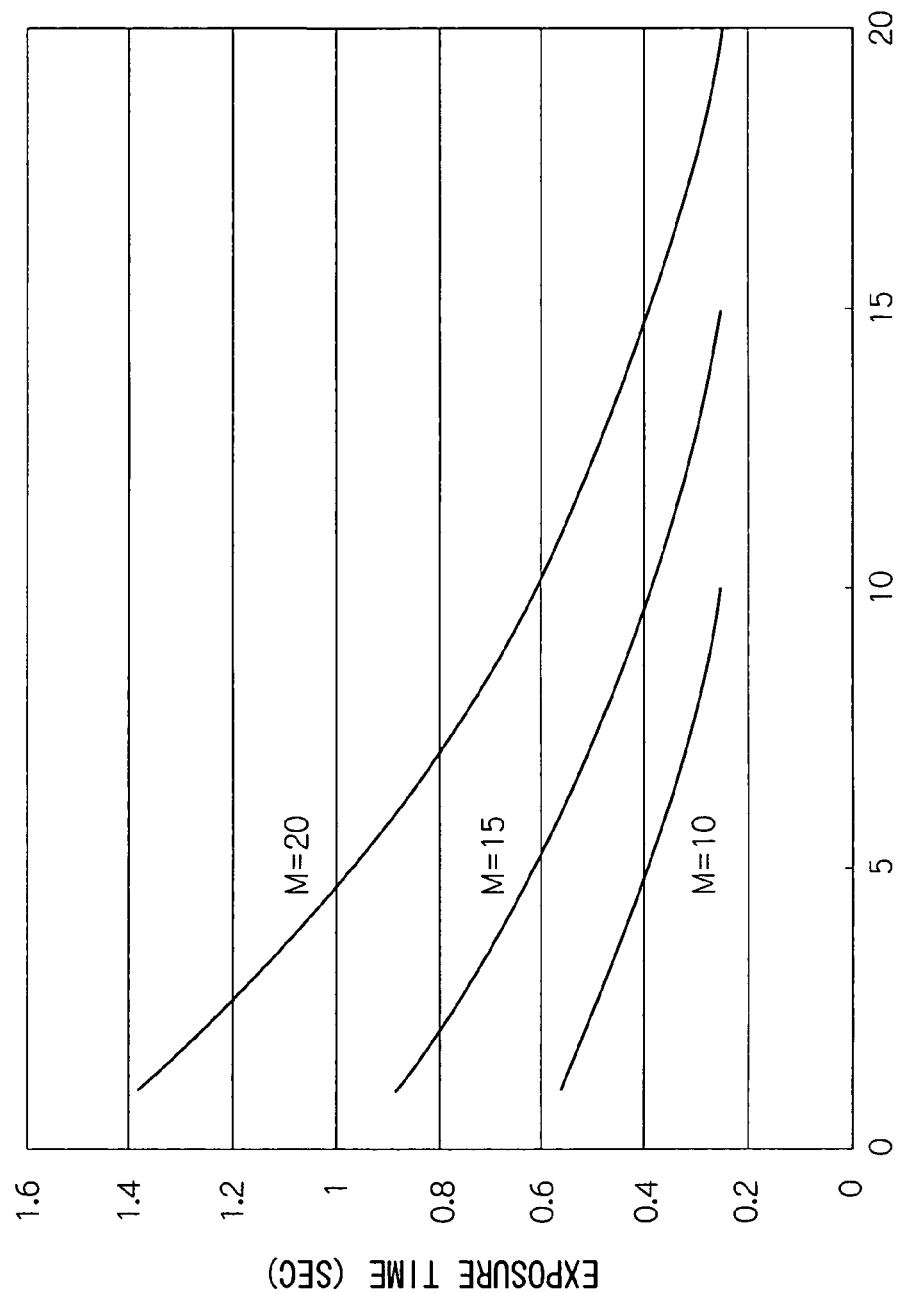
FIG. 8 is a graph showing exposure time $t_N$ at various degrees of multiplicity M.
Figure 9:
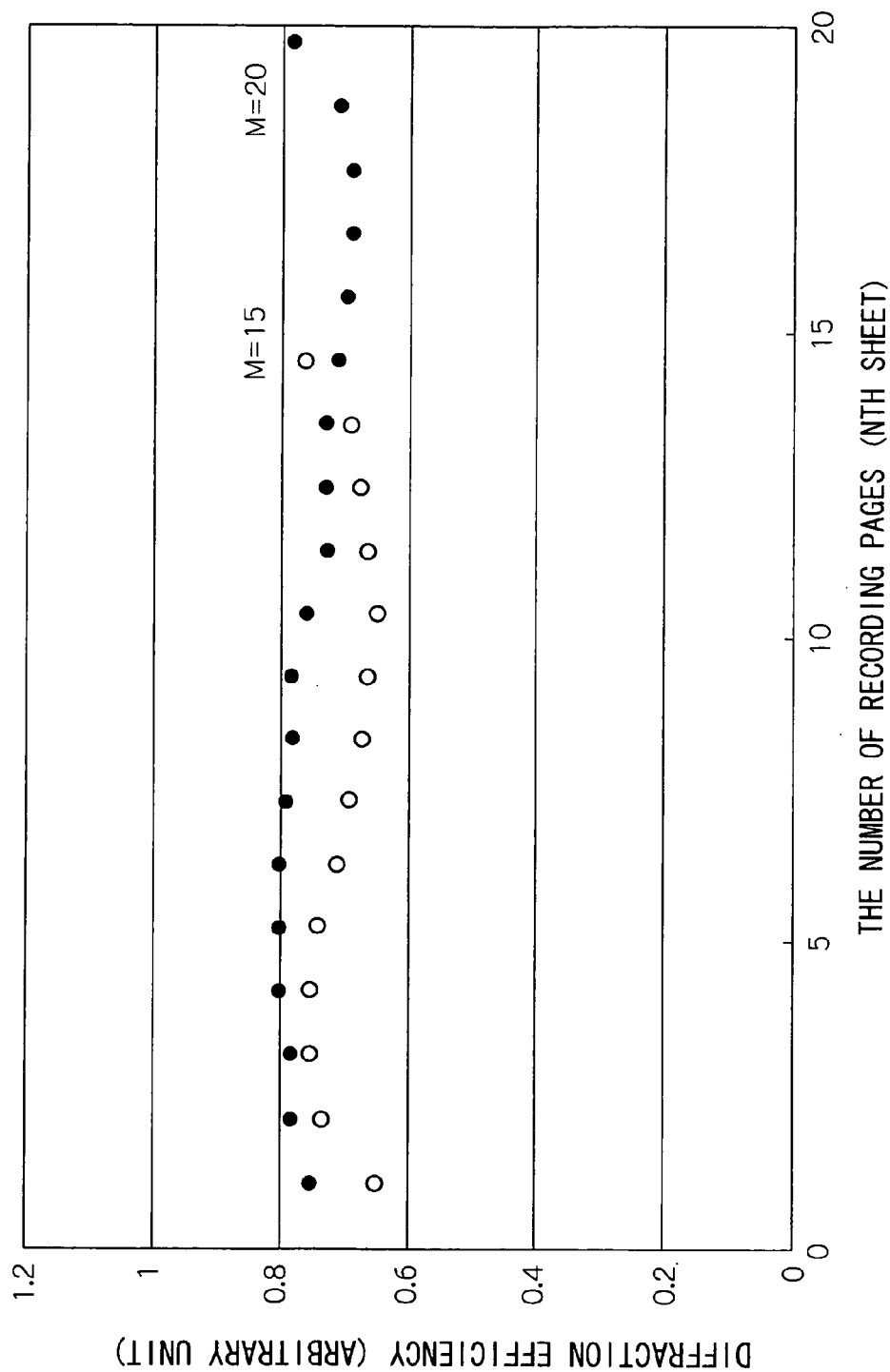
FIG. 9 is a graph showing the normalized diffraction efficiency of the reproduced image at various degrees of multiplicity M.

FIG. 7 shows a normalized diffraction efficiency of the reproduced images of a first page to a 19th page when M is set to 20. In the case where the exposure time is set according to the expression (2), as shown in FIG. 7, the diffraction efficiency of each page can be substantially uniformed. When the exposure time $t_N$ is determined in the different degrees of multiplicity M, the result is obtained as shown in FIG. 8. Since the exposure time of the final page is fixed, as the degree of multiplicity is decreased, the exposure time of the initial page is shortened, and the whole exposure time can be also shortened. FIG. 9 shows the normalized diffraction efficiencies of M=15 and M=20. As can be seen from FIG. 9, even in the case where the degrees of multiplicity are different from each other, the diffraction efficiency can be substantially uniformed.

Thus, by using the expression (1) or the expression (2), diffraction efficiencies of the holograms of the plurality of pages included in the same file can be substantially uniformed, and diffraction efficiencies of the holograms included in the files having the different degrees of multiplicity can be also substantially uniformed.

In the method expressing the two-dimensional image with the digital data, there is a method referred to as differential coding method in addition to the above-described method in which 1 is expressed by the maximum step of the gradation (white) and 0 is expressed by the minimum step of the gradation (black) (Science, 265, 749(1994)). When the differential coding method is adopted, since whether 1 or 0 is decided by detecting a change from white to black or the change from black to white, the restriction that the threshold is fixed as described above can be decreased. Therefore, the coding can be correctly performed even if the diffraction efficiency of each page is not uniformed. In the case where the differential coding method in which the restriction of the threshold detection is loose is adopted, generally the more diffraction efficiency of the reproduced image, the more readout error can be decreased. Accordingly, the exposure schedule can be set so that the diffraction efficiency of the reproduced image is increased.

For example, the expression (1) can be used in order to set the exposure schedule. When an extended exposure time is not wanted, the constant A can be set to the value of the exposure time (sec) for obtaining the diffraction efficiency required for the reproduction from the hologram of the final page. In order to decrease the exposure time, the value of the constant A may be set as small as possible.

The constant B is increased as the degree of multiplicity M is decreased. Accordingly, however, the whole exposure time is longer than that of the conventional schedule exposure method, the exposure time of the final page becomes equal irrespective of the degree of multiplicity M. Further, even in the files having the different degrees of multiplicity M, since the large difference is not generated in the exposure time of the initial page, an average of the diffraction efficiency of each page can be increased. For example, in the degree of multiplicity M ranging from 1 to 20, the exposure time $t_N$ can be determined according to the degree of multiplicity M by using the following three expressions.

Expression 3

When $1 \leq M \leq 8$, $t_N = 0.25 \ast \exp(-0.35 \ast (N-M))$ (1)

When $9 \leq M \leq 15$, $t_N = 0.25 \ast \exp(-0.18 \ast (N-M))$ (2)

When $16 \leq M \leq 20$, $t_N = 0.25 \ast \exp(-0.09 \ast (N-M))$ (3)

Figure 4:
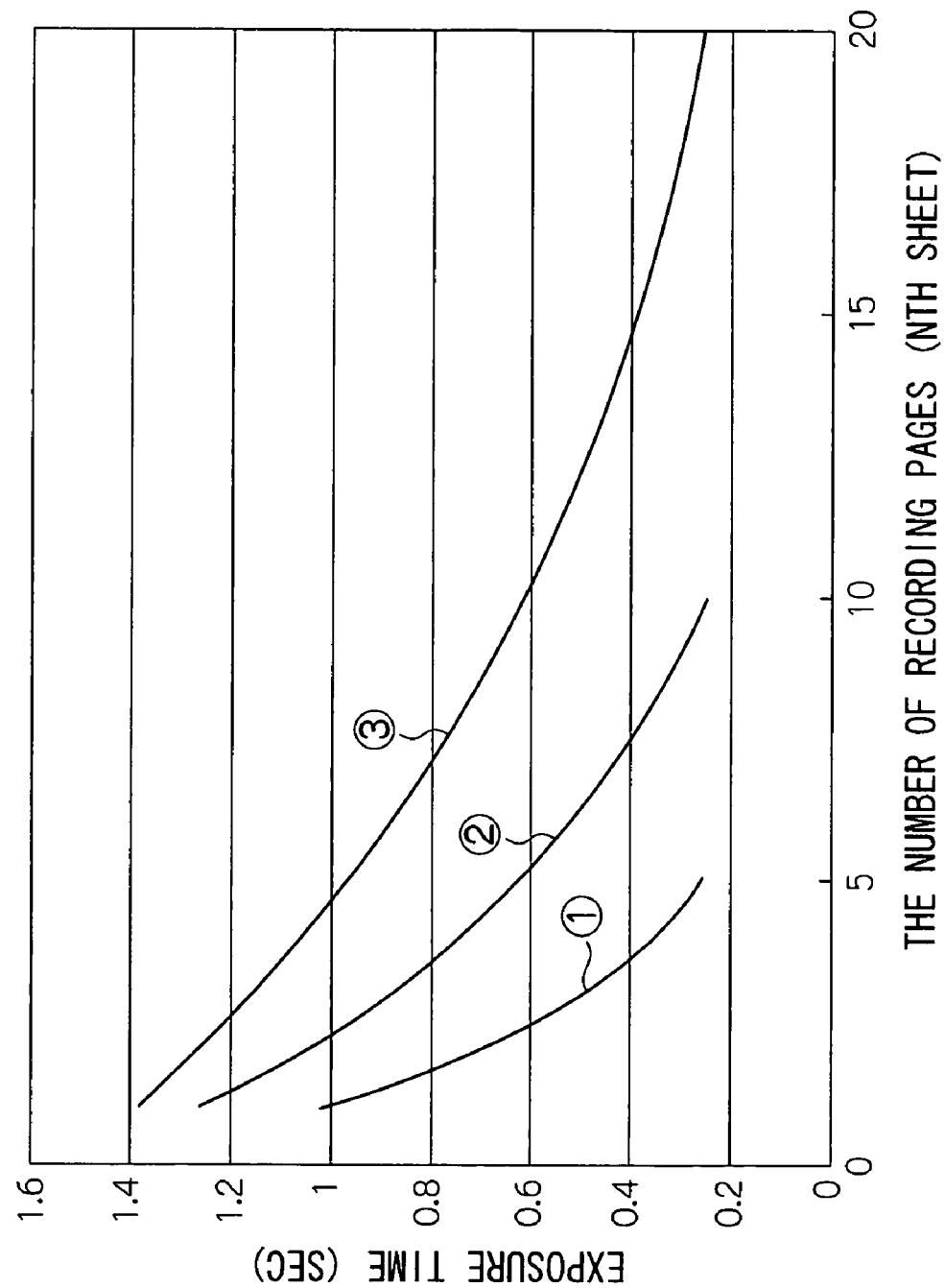
FIG. 4 is a graph showing an exposure schedule according to a degree of multiplicity of a file.
Figure 10:
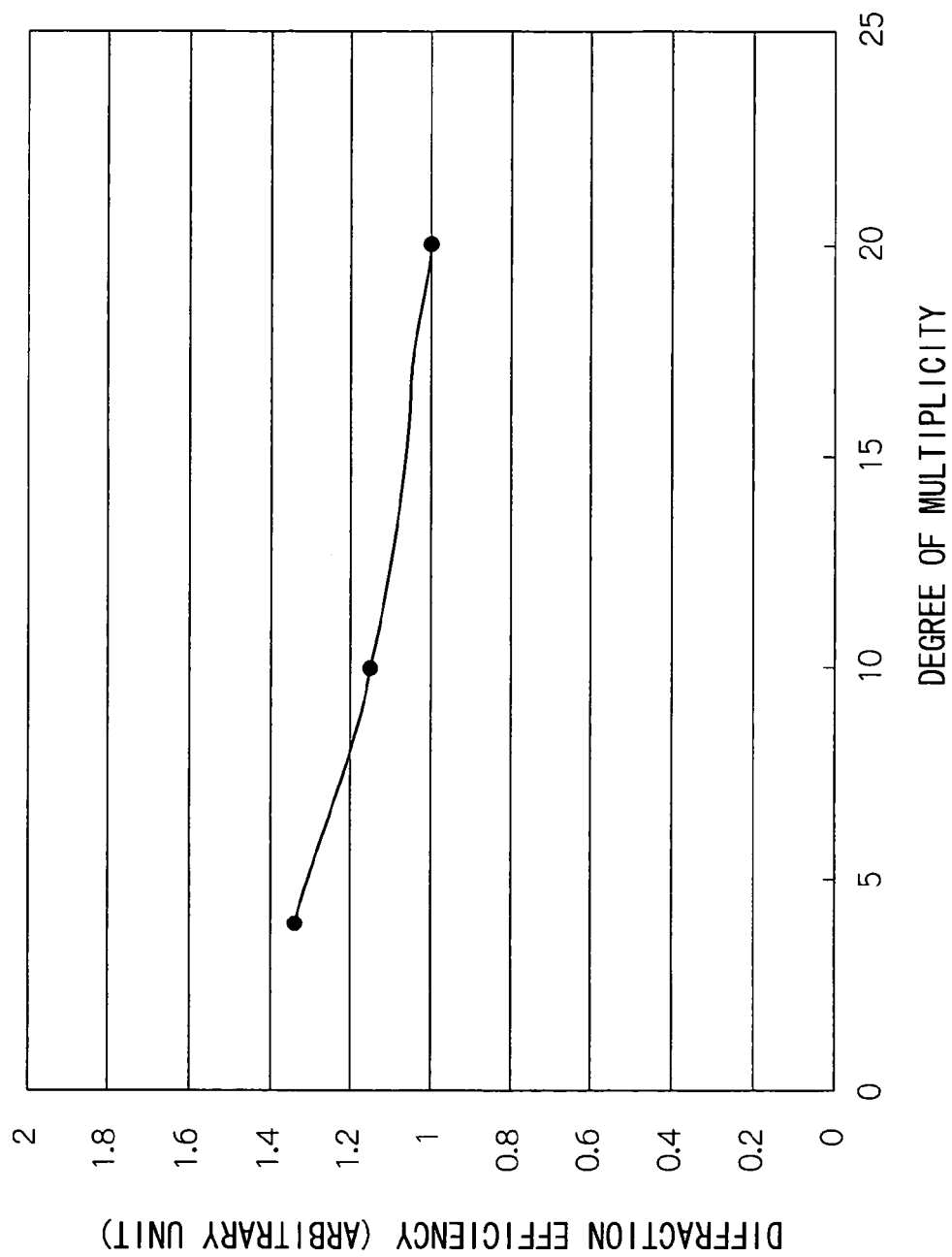
FIG. 10 is a graph showing the normalized diffraction efficiency when exposure is performed by using the exposure schedule according to the degree of multiplicity.
Figure 11A:
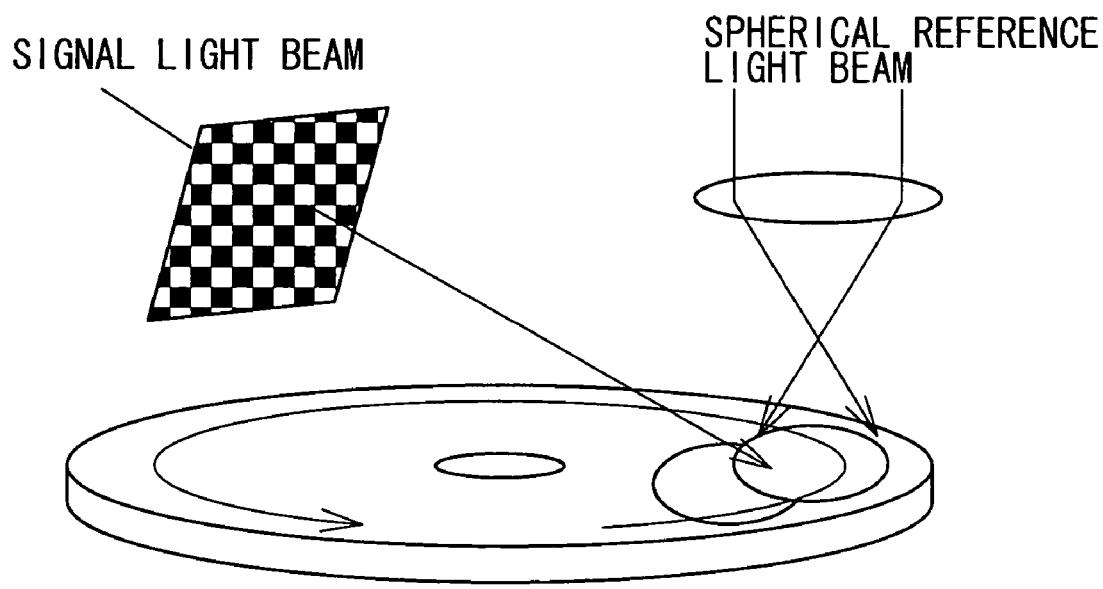
FIGS. 11A and 11B are a view illustrating a shift multiplex recording method.
Figure 11B:
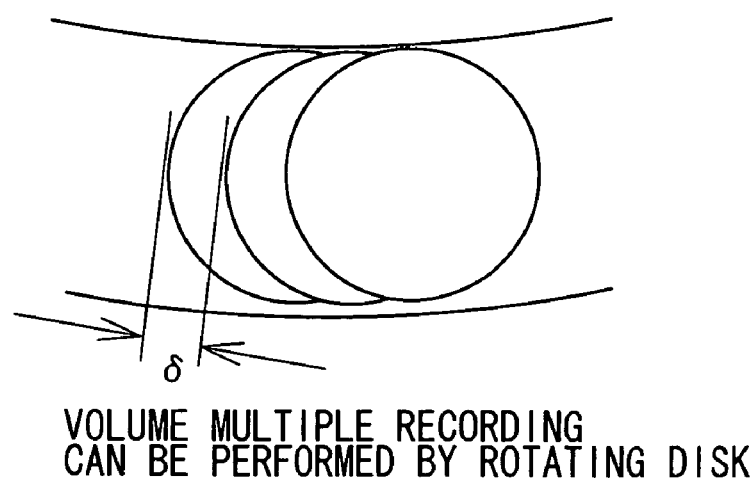

As shown in FIG. 4, when the exposure time $t_N$ is determined by the above three expressions, each exposure time of the final pages becomes equal irrespective of the degree of multiplicity M. The multiplex recording was performed by using the three files having the data pages corresponding to M=4, 10, and 20 respectively, and a mean diffraction efficiency of the reproduced image of the data page was determined in each file. FIG. 10 shows a comparison when the mean diffraction efficiency is set to 1 in the case of M=20. As shown in FIG. 10, in the case where the degree of multiplicity M is not more than 20, the diffraction efficiency can be larger than that of the case in which the above third expression is used. Accordingly, setting the constant B to the proper value, the diffraction efficiency can be increased. As a result, the readout error can be further decreased during the decoding.

In Step 104, while the driving device 48 is driven to retract the shutter 12 from the optical path so that the laser beam can pass through, the stepping motor of the x-y stage 22 is driven by the driving device 50 to rotate the holographic recording medium at predetermined rotational speed.

In Step 106, while the holographic recording medium is irradiated with the laser beam, the personal computer 42 outputs the recording signal in each page at predetermined timing according to the exposure schedule, and the shift multiplexing processing of the hologram is executed into the holographic recording medium.

In the case where the personal computer 42 decides that the reproducing processing of the hologram has been selected in Step 100, the shutter 12 is inserted into the optical path in Step 108, and the reproducing processing of the hologram is executed in Step 110. Since the laser beam transmitted through the polarizing beam-splitter 16 is interrupted by inserting the shutter 12 into the optical path, the holographic recording medium 24 in which the hologram is recorded is irradiated only with the reference light beam.

The reproduced light beam diffracted by the holographic recording medium 24 is transmitted through the lens 38, and only the reproduced light beam having a predetermined polarized component is selectively transmitted by the analyzer 44 and received by the detector 40. The received reproduced light beam is converted into an electric signal by the detector 40 and input in the personal computer 42, and then the electric signal is decoded by the decoder to reconstruct the original digital data.

In the shift multiplexing method of the embodiment, the spherical wave is used as the reference light beam, the holographic recording material is formed in the shape of the disk, and the shift multiplexing is performed by rotating the disk-shaped holographic recording medium (disk). In the shift multiplexing method, the holograms of the plurality of pages can be recorded by the rotation of the disk while the holograms of the plurality of pages are overlaid at the same region. When the wavelength of the laser beam, the film thickness of the recording medium, NA of the objective lens, and the like are properly set, the hologram of the next page can be recorded and reproduced in the substantially same region of the disk without crosstalk between the next page and the page in which the hologram has been already recorded, only by rotating the disk so that the recording position is shifted by several tens μm in order to record the hologram of the next page. This takes advantage of the fact that the shift of the disk-shaped holographic recording medium (the shift by several tens μm) is equivalent to a change in an angle of the reference light beam, because the reference light beam is the spherical wave.

A distance which defines the amount of shift of the disk-shaped holographic recording medium of the shift multiplexing using the spherical reference wave, i.e. the distance $\delta_{spherical}$ in which each hologram can be independently separated is given by the following equation (3).

Expression 4

$$\delta_{spherical} = \delta_{Bragg} + \delta_{NA} \approx \frac{\lambda z_0}{L \tan \theta_s} + \frac{\lambda}{2(NA)}$$ (3)

Where $\lambda$ is the wavelength of the laser beam, $z_O$ is the distance between the objective lens generating the spherical reference wave and the holographic recording medium, L is the film thickness of the holographic recording medium, NA is a numerical aperture of the objective lens, and $\theta_S$ is the angle between the signal light beam and the reference light beam. From the above expression (3), as the film thickness L of the holographic recording medium becomes larger, the amount of shift δ defined according to the distance in which each hologram can be independently separated becomes smaller. Accordingly, the multiplicity can be increased and the recording capacity can be also increased.

The personal computer supplies the recording signal of each page to the spatial light modulator at timing defined so that the hologram of each page is recorded from the recording start position at an interval of the mount of shift δ, while the holographic recording medium is being rotated.

In the embodiment, similarly to the typical digital holographic storage, Fourier transformation of the signal light beam is performed with the lens, and the holographic recording medium is irradiated with the Fourier-transformed signal light beam. Relatively strong light intensity can be obtained at the surface of the holographic recording medium by using the lens. At this point, when the distance between the Fourier transform lens and the holographic recording medium is caused to be equal to a focal length of the lens, a Fourier transform hologram is recorded. Generally the holographic recording is performed while the recording medium is slightly shifted from a focal position of the lens in order to suppress the intensity of the zero-order diffraction light beam of the signal light beam on the recording surface.

Figure 5:
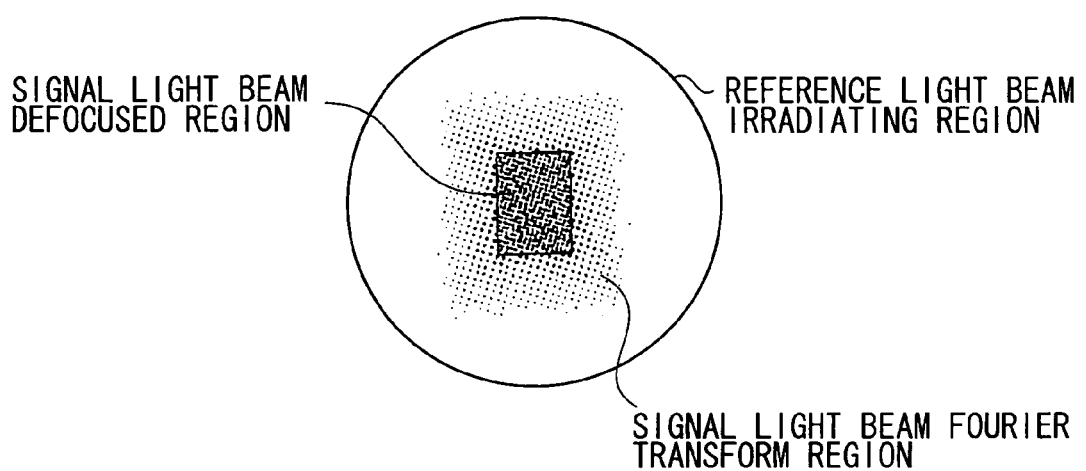
FIG. 5 is a schematic view showing a relationship between a signal light irradiating region and a reference light irradiating region.

FIG. 5 schematically shows a state of a defocused position during the holographic recording. The signal light beam is condensed at a certain extent by the lens, and a diffraction pattern of a data page appears. The diffraction pattern corresponds to a pattern (periodicity) of the digital data page and has the largest spread when the digital data page has a random pattern.

The region which is wider than that of the diffraction pattern of the signal light beam is irradiated with the reference light beam so that the reference light beam covers the entire diffraction patterns of the signal light beam. The change in refractive index or the change in the absorption is generated at the position where the light beam is strengthened by interference between the signal light beam and the reference light beam, and these changes are small at the position where the light beam is weakened. This phenomenon causes each page of the hologram to be recorded.

As described above, in the embodiment, diffraction efficiencies of the holograms of the plurality of pages included in the same file is uniformed in the case where the multiplex recording of the plurality of files having an arbitrary degree of multiplicity is performed. Further, the exposure schedule is set so that each exposure time of the holograms of the final pages included in the different files becomes equal, and the exposure is performed according to the exposure schedule. Therefore, even in the files having the different degrees of multiplicity, the diffraction efficiency of the hologram of each page becomes equal and the variations in diffraction efficiency is prevented. Since the exposure time of the hologram of the final page is fixed irrespective of the degree of multiplicity, the recording time can be intended to shorten.

Although the shift multiplexing in which the multiplex recording is performed by rotating the holographic recording medium was described in the above embodiment, the shift multiplexing may also be performed by linearly moving the holographic recording medium. Further, instead of the rotation or the linear movement of the holographic recording medium, the signal light beam and the reference light beam may also be scanned on the holographic recording medium.

Figure 6:
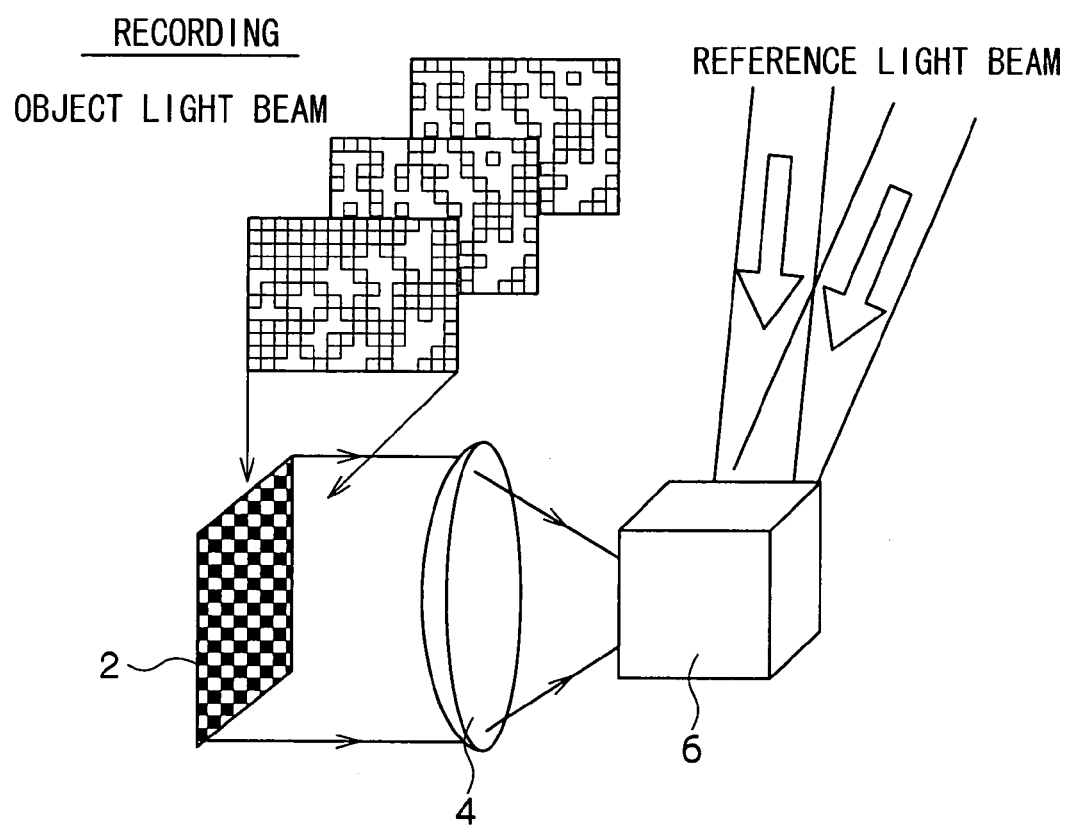
FIG. 6 is a view illustrating an angle multiplex recording method which one of holographic multiplex recording method.

Although the embodiment in which the invention is applied to the shift multiplex recording method was described, the invention can be also applied to the angle multiplexing method and the phase-code multiplex recording method. In the case where the invention is applied to the angle multiplexing method, as shown in FIG. 6, in recording the hologram of the initial page, the multiplex recording of the information of the signal light beam is performed into the holographic recording medium in the form of the holograms of the plurality of pages, in such a manner that a recording angle is changed by irradiating the optical recording medium with the signal light beam and the reference light beam at the same time while the angle formed by the reference light beam relative to the signal light beam is being changed by a predetermined angle θ. Further, it will be appreciated that the multiplexing is performed by changing the angle of the signal light beam relative to the reference light beam.

In the case where the invention is applied to the phase-code multiplexing method, the multiplexing of the information of the signal light beam is performed into the holographic recording medium in the form of the holograms of the plurality of pages, in such a manner that the angle formed by the signal light beam and the reference light beam is fixed and the optical recording medium is irradiated with the signal light beam and the reference light beam at the same time while the phase of the reference light beam is being changed.

In the above descriptions, although the cases in which the multiplex recording of the data of the plurality of pages is performed in each file were explained, the invention is not limited to the file-by-file holographic recording. That is to say, the invention can be applied to any case as long as the number of pages multiplexed in the same region of the recording medium is different. For example, in the case where the pages having the 15 degrees of multiplicity and the pages having the 10 degrees of multiplicity are recorded by one operation in the recording medium in which the multiplex recording of the 20 degrees of multiplicity can be performed at the maximum in the same region, the multiplex recording of the 20 degrees of multiplicity is performed in one region and the multiplex recording of the 5 degrees of multiplicity is performed in another region. Thus, the invention can be applied to any case, as long as the number of pages (multiplicity) recorded in the same region is different and the diffraction efficiencies of the pages are uniformed.

What is claimed is:

1. A holographic recording method comprising:
performing multiplex recording of information of a signal light beam into an optical recording medium in a form of holograms of a plurality of pages, in such a manner that a recording angle is changed by irradiating the optical recording medium with the signal light beam and a reference light beam at the same time while an angle formed by the signal light beam and the reference light beam is being changed,
wherein the multiplex recording of data of the plurality of pages is performed, in such a manner that an exposure time of the hologram of a final page to be recorded is fixed irrespective of a degree of multiplicity while an exposure time of each page is changed so that diffraction efficiencies of the holograms of the plurality of pages becomes equal.

2. The method of claim 1, wherein exposure time $t_N$ of the hologram to be recorded for the Nth time is expressed by an expression including a term of an exponential function having variables M and N, in the case where the degree of multiplicity is set to M.

3. The method of claim 1, wherein the exposure time $t_N$ of the hologram to be recorded for the Nth time is expressed by the exponential function having variables M and N, in the case where the degree of multiplicity is set to M.

4. A holographic recording method comprising:
performing multiplex recording of information of a signal light beam into an optical recording medium in a form of holograms of a plurality of pages, in such a manner that an angle formed by the signal light beam and a reference light beam is fixed and a recording position is changed by irradiating the optical recording medium with the signal light beam and the reference light beam at the same time while at least one of the signal light beam and the reference light beam and the optical recording medium is relatively being moved,
wherein the multiplex recording of data of the plurality of pages is performed, in such a manner that an exposure time of the hologram of a final page to be recorded is fixed irrespective of a degree of multiplicity while the exposure time of each page is changed so that diffraction efficiencies of the holograms of the plurality of pages becomes equal.

5. The method of claim 4, wherein exposure time $t_N$ of the hologram to be recorded for the Nth time is expressed by an expression including a term of an exponential function having variables M and N, in the case where the degree of multiplicity is set to M.

6. The method of claim 4, wherein the exposure time $t_N$ of the hologram to be recorded for the Nth time is expressed by the exponential function having variables M and N, in the case where the degree of multiplicity is set to M.

7. A holographic recording method comprising:
performing multiplex recording of information of a signal light beam into an optical recording medium in a form of holograms of a plurality of pages, in such a manner that an angle formed by the signal light beam and a reference light beam is fixed and the optical recording medium is irradiated with the signal light beam and the reference light beam at the same time while a phase of the reference light beam is being changed,
wherein the multiplex recording of data of the plurality of pages is performed, in such a manner that an exposure time of the hologram of a final page to be recorded is fixed irrespective of a degree of multiplicity while the exposure time of each page is changed so that diffraction efficiencies of the holograms of the plurality of pages becomes equal.

8. The method of claim 7, wherein exposure time $t_N$ of the hologram to be recorded for the Nth time is expressed by an expression including a term of an exponential function having variables M and N, in the case where the degree of multiplicity is set to M.

9. The method of claim 7, wherein the exposure time $t_N$ of the hologram to be recorded for the Nth time is expressed by the exponential function having variables M and N, in the case where the degree of multiplicity is set to M.

10. A holographic recording method comprising:
performing multiplex recording of information of a signal light beam into an optical recording medium in the form of holograms of a plurality of pages, in such a manner that a recording angle is changed by irradiating the optical recording medium with the signal light beam and a reference light beam at the same time while an angle formed by the signal light beam and the reference light beam is being changed; and
wherein the multiplex recording of data of the plurality of pages in each file is performed, in such a manner that each exposure time of the holograms of final pages included in different files is fixed irrespective of a degree of multiplicity while an exposure time of said each page is changed so that diffraction efficiencies of the holograms of the plurality of pages included in the same file becomes equal.

11. The method of claim 10, wherein exposure time $t_N$ of the hologram to be recorded for the Nth time is expressed by an expression including a term of an exponential function having variables M and N, in the case where the degree of multiplicity is set to M.

12. The method of claim 10, wherein the exposure time $t_N$ of the hologram to be recorded for the Nth time is expressed by the exponential function having variables M and N, in the case where the degree of multiplicity is set to M.

13. A holographic recording method comprising:
performing multiplex recording of information of a signal light beam into an optical recording medium in the form of holograms of a plurality of pages, in such a manner that an angle formed by the signal light beam and a reference light beam is fixed and a recording position is changed by irradiating the optical recording medium with the signal light beam and the reference light beam at the same time while at least one of the signal light beam and the reference light beam and the optical recording medium is relatively being moved,
wherein the multiplex recording of data of the plurality of pages in each file is performed, in such a manner that an each exposure time of the holograms of final pages included in different files is fixed irrespective of a degree of multiplicity while the exposure time of each page is changed so that diffraction efficiencies of the holograms of the plurality of pages included in the same file becomes equal.

14. The method of claim 13, wherein exposure time $t_N$ of the hologram to be recorded for the Nth time is expressed by an expression including a term of an exponential function having variables M and N, in the case where the degree of multiplicity is set to M.

15. The method of claim 13, wherein the exposure time $t_N$ of the hologram to be recorded for the Nth time is expressed by the exponential function having variables M and N, in the case where the degree of multiplicity is set to M.

16. A holographic recording method comprising:
performing multiplex recording of information of a signal light beam into an optical recording medium in the form of holograms of a plurality of pages, in such a manner that an angle formed by the signal light beam and a reference light beam is fixed and the optical recording medium is irradiated with the signal light beam and the reference light beam at the same time while a phase of the reference light beam is being changed,
wherein the multiplex recording of data of the plurality of pages in each file is performed, in such a manner that each exposure time of the holograms of final pages included in different files is fixed irrespective of a degree of multiplicity while an exposure time of each page is changed so that diffraction efficiencies of the holograms of the plurality of pages included in the same file becomes equal.

17. The method of claim 16, wherein exposure time $t_N$ of the hologram to be recorded for the Nth time is expressed by an expression including a term of an exponential function having variables M and N, in the case where the degree of multiplicity is set to M.

18. The method of claim 16, wherein the exposure time $t_N$ of the hologram to be recorded for the Nth time is expressed by the exponential function having variables M and N, in the case where the degree of multiplicity is set to M.

* * * * *